(No Model.)

E. F. PASCHAL.
ANDIRON.

No. 475,701. Patented May 24, 1892.

Witnesses:
J. B. McGirr.
Jno. O'Connell

Inventor:
E. F. Paschal
by Connolly Bros
Attys

THE NORRIS PETERS CO., PHOTO-LITHO., WASHINGTON, D. C.

UNITED STATES PATENT OFFICE.

EZEKIEL F. PASCHAL, OF HIGH POINT, NORTH CAROLINA, ASSIGNOR OF ONE-HALF TO ELIZA A. DEVENISH, OF SAME PLACE.

ANDIRON.

SPECIFICATION forming part of Letters Patent No. 475,701, dated May 24, 1892.

Application filed January 18, 1892. Serial No. 418,484. (No model.)

*To all whom it may concern:*

Be it known that I, EZEKIEL F. PASCHAL, a citizen of the United States, residing at High Point, in the county of Guilford and State of North Carolina, have invented certain new and useful Improvements in Andirons; and I do hereby declare the following to be a full, clear, and exact description of the invention, reference being had to the accompanying drawings, which form part of this specification.

My invention has relation to andirons, and has for its object the provision of andirons of novel form and construction which, in addition to the ordinary function of supporting the burning logs in a fireplace, will serve, also, as a pot or kettle support, a broiler, and a screen to prevent the burning logs from falling upon the floor in front of the hearth.

In carrying my invention into effect I provide an andiron of the ordinary form with a perforated or grated metallic plate which is attached to or secured upon the front of the andiron in such manner as to be adjustable to various positions, so that it will serve in succession as an ornament for the front part of the andiron, as a pot or kettle support, as a broiler or trivet, and as a screen to prevent the burning logs from falling upon the floor in front of the hearth.

My invention consists in the novel construction, combinations, and arrangements of parts hereinafter described.

Figure 1:
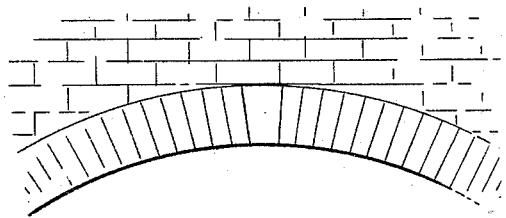
Figure 2:
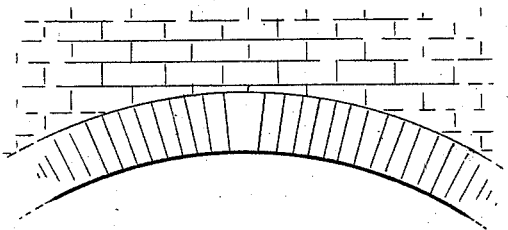
Figure 3:
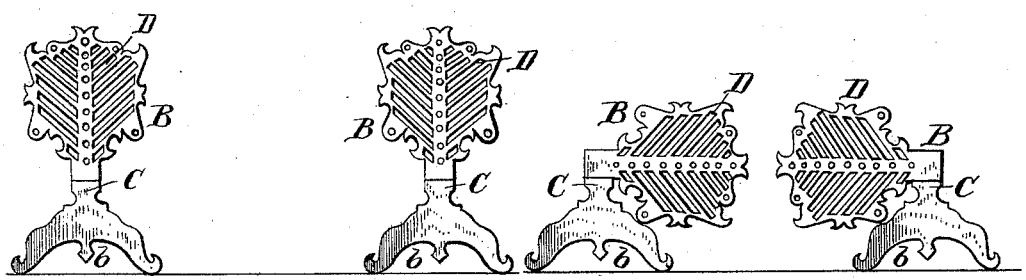
Figure 5:
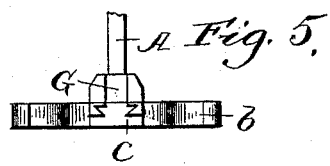
Figure 4:
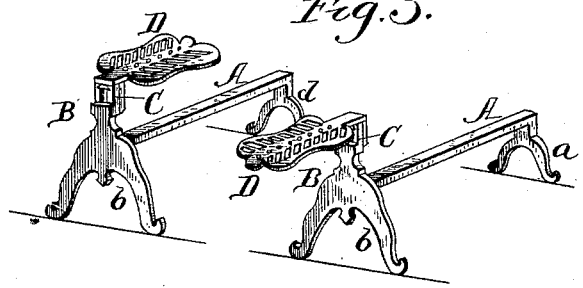
Figure 6:
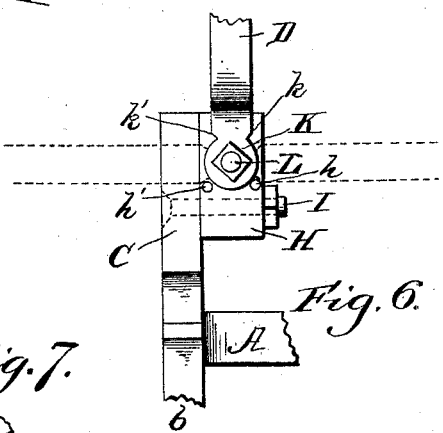
Figure 7:
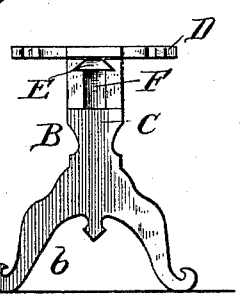

In the accompanying drawings, illustrating my improvement, Figure 1 is a front elevation of a pair of andirons with my improvements applied, the supplemental grated metallic plate being in position to serve merely as an ornamental appendage. Fig. 2 is a similar view, but with the supplemental plates arranged so as to serve as a screen or fender to prevent the logs from falling on the floor. Fig. 3 is a perspective view, the supplemental plate on one andiron being arranged in position as a pot or kettle support and the plate on the other iron being arranged to serve as a broiler. Fig. 4 is a front elevation of one of the andirons with the supplemental plate in position as a broiler, this view showing the attachment of the supplemental plate to the andiron. Fig. 5 is a top view of one of the andirons with the plate removed, and Figs. 6 and 7 are detail views showing a modified form of the means for attaching the plate to the andiron.

The andiron proper is composed of the horizontal rod or bar A, bent down at its rear end so as to form a foot $a$, which rests upon the hearth, and the ornamental front B, having the feet $b\ b$, which also rest upon the hearth, and the vertical portion C, which in andirons of the ordinary kind is merely an ornamental appendage, as a ball or scroll, but which in my improvement is provided with means for securing thereto the supplemental grated or perforated flat metallic plate D, such means comprising, as shown in Figs. 4 and 5, a square block E, having both its sides and ends beveled or undercut, a vertical dovetail groove F, and a horizontal dovetail groove G, the said block being attached to or formed as a part of the supplemental plate D and the dovetailed grooves being formed in the vertical portion C of the andiron. Where this beveled block and the dovetailed grooves are employed as a means of attaching the supplemental plate to the andiron, it is necessary to entirely disconnect the plate and the andiron when the position of the former is to be changed; but as it may be found desirable to provide for the required changes of position of the plate without disconnecting the same from the andiron I suggest as a modification of the device shown in Figs. 1 to 5 that shown in Figs. 6 and 7. In the latter figures, instead of the beveled block and dovetailed grooves I secure the supplemental plate and the andiron together by means of a universal joint, so that the plate may be adjusted to any required position without disconnecting it from the andiron. The universal joint shown in Figs. 6 and 7 is composed of a metallic block H, which is pivotally secured to the vertical portion C of the andiron by a horizontal bolt I and a semicircular plate K, which is attached to or formed as part of the supplemental plate D and is pivotally attached to the block H by a horizontal bolt L, which is arranged at right angles to the bolt I. A shoulder $k$ on the plate K contacts with a lug $h$ on the block H when the plate is in a horizontal position over the rod or bar A and serves to uphold the plate in this position, and another shoulder $k'$ serves, by coming into contact with the same lug $h$, to uphold the plate in a horizontal position in front of the andiron. The plates C ordinarily stand in the position in which they are shown in Fig. 1, and in this position are merely an ornamental appendage to the andirons, the plates being maintained in position by the beveled blocks fitted into the vertical grooves F F.

When it is desired to have the plates serve the purpose of a fender or screen, they are disconnected from the andirons and replaced in the position shown in Fig. 2, the beveled blocks being fitted, as before, into the vertical grooves F, but at right angles to the position shown in Fig. 1.

If it is desired to use the plate as a broiler or stand to support a cooking utensil directly over the fire, the plate is removed from engagement with the andiron and placed in a horizontal position directly over the rod A, the beveled block E being now fitted into the horizontal dovetailed slot or groove G.

When it is desired to use the supplemental plate to support a utensil near but not directly over the flames, the plate is arranged as shown in Fig. 3 at the left-hand side of said figure, the beveled block being fitted in the horizontal slot, but the plate projecting forward of the andiron, so as to support the utensil near but not over the flames.

The above description of the operation of my improvement is applicable to the devices shown in Figs. 1, 2, 3, 4, and 5; but where the modification shown in Figs. 6 and 7 is adopted the plates can be moved to any desired or necessary position without disconnecting them from the andirons.

Having fully described my invention, I claim—

1. The combination, with an andiron, of a universally-adjustable plate attached to the andiron, substantially as described.

2. The combination, with an andiron, of a metallic plate, and means, substantially as described, for securing said plate to the andiron in a horizontal or a vertical position, as set forth.

3. The combination, with an andiron having its vertical portion C formed with a vertical dovetailed groove F and with a horizontal dovetailed groove G, of the plate D, having the beveled block E, adapted to be fitted in said grooves, substantially as described.

In testimony that I claim the foregoing I have hereunto set my hand this 22d day of December, 1891.

E. F. PASCHAL.

Witnesses:
 CHAS. RAGAN,
 EUGENE M. ARMFIELD.